(12) United States Patent
Foss et al.

(10) Patent No.: US 10,753,779 B1
(45) Date of Patent: Aug. 25, 2020

(54) MASS FLOW METER

(71) Applicants: John F. Foss, East Lansing, MI (US);
Vytau K. Virskus, Mason, MI (US)

(72) Inventors: John F. Foss, East Lansing, MI (US);
Vytau K. Virskus, Mason, MI (US)

( * ) Notice: Subject to any disclaimer, the term of this patent is extended or adjusted under 35 U.S.C. 154(b) by 0 days.

(21) Appl. No.: 16/806,372

(22) Filed: Mar. 2, 2020

(51) Int. Cl.
*G01F 1/86* (2006.01)
*G01F 1/22* (2006.01)
*G01F 15/18* (2006.01)

(52) U.S. Cl.
CPC ............... *G01F 1/86* (2013.01); *G01F 1/22* (2013.01); *G01F 15/185* (2013.01)

(58) Field of Classification Search
CPC ........................... G01F 1/86; G01F 1/22
See application file for complete search history.

(56) References Cited

U.S. PATENT DOCUMENTS

| | | |
|---|---|---|
| 4,241,613 A | 12/1980 | Bradham, III |
| 4,381,680 A | 5/1983 | Shiota |
| RE31,450 E | 11/1983 | Smith |
| 4,523,479 A | 6/1985 | Johnson |
| 4,635,485 A | 1/1987 | Lew |
| 4,852,410 A | 8/1989 | Corwon et al. |
| 5,253,533 A | 10/1993 | Lam et al. |
| 5,463,903 A | 11/1995 | Delatorre |
| 5,583,302 A | 12/1996 | Perrin |
| 5,736,652 A | 4/1998 | Strubbe |
| 7,353,718 B2 | 4/2008 | Mehendale et al. |
| 7,603,915 B2 | 10/2009 | Spivak et al. |
| 8,205,508 B2 * | 6/2012 | Healey ............ F03B 13/00 73/861.352 |
| 8,353,221 B2 * | 1/2013 | Schmid ............ G01F 1/82 73/861.77 |
| 2008/0148868 A1 | 6/2008 | Mehendale et al. |
| 2018/0252562 A1 | 9/2018 | Seeberg |
| 2018/0340808 A1 * | 11/2018 | Liu ................ G01F 1/28 |
| 2019/0277672 A1 * | 9/2019 | van Beurden ....... E21B 21/08 |

OTHER PUBLICATIONS

TJS Brain and RWW Scott, Survey of pipeline flowmeters, J. Phys. E: Sci. Instrum., Apr. 7, 1982, 967-979, vol. 15, The Institute of Physics, Great Britain.

* cited by examiner

*Primary Examiner* — Jewel V Dowtin
(74) *Attorney, Agent, or Firm* — Vivacqua Crane, PLLC

(57) ABSTRACT

A mass flow meter includes one or more sensing elements that are exposed to a fluid flow in a pipe or conduit. The preferred sensing elements comprise two types: a first having a single curved azimuthal arm and a second having two, i.e., outer and inner, curved azimuthal arms. In a preferred embodiment, three of the first elements, occupying approximately 60°, alternate with three of the second elements, the outer arms occupying approximately 60° and the inner arms occupying approximately 120°. Each sensing element includes a torque transfer portion which extends through the flow pipe or conduit and a lever arm outside the pipe which engages a circumferential torque collecting ring. The ring, in turn, engages a fixed element or fin having a torque sensing device such as one or more strain gauges affixed thereto. Alternatively, flow and torque sensing may be achieved by an LVDT or servo-feedback system.

20 Claims, 6 Drawing Sheets

MASS FLOW METER

INTRODUCTION

The present disclosure relates to a mass flow meter and more particularly to a mass flow meter having one or more sensing elements disposed in a fluid flow path and one or more torque or movement sensing devices such as one or more strain gauges, a linear variable differential transformer or a servo feedback assembly which, through a linkage, detect deflection of such sensing elements.

BACKGROUND

The real time measurement of mass fluid flow, both liquids and gasses, in pipes and conduits is an important and oftentimes critical capability in innumerable commercial and industrial processes, environmental control apparatus, energy supply systems and municipal infrastructure, to name only the more important. Mass flow measurements have taken on particular significance with the rapidly increasing concern for determining the thermal flow of heating and cooling fluids.

Due to this critical necessity, several types of mass flow meters have been developed over the years which exhibit certain characteristics which render them especially suitable for certain applications. One of the least complex types comprehends a calibrated tube which tapers (narrows) downwardly, carries upwardly directed flow and includes a float. As flow increases, the float rises providing a visual indication of the present flow rate.

A more complex flow meter includes a turbine rotor disposed in a pipe, preferably at a distance downstream of turbulence inducing features such as corners and valves. A sensor mounted in the pipe proximate the turbine rotor senses its rotation and provides a signal to associated equipment which may provide current flow or which may be integrated to provide accumulated flow.

A third type of flow sensor having somewhat limited application utilizes Venturi nozzles or throats. In these devices, the difference in pressure at pressure taps before and at the Venturi constriction are utilized to calculate fluid flow.

A related, less complicated device is an orifice plate. Pressure readings are taken upstream and downstream of the orifice plate from which flow may be adduced. While it is generally accepted that orifice plate flow readings are accurate when the plate is new, wear or damage to the orifice can significantly and adversely affect its accuracy.

Thus, while current flow meters generally achieve their intended purpose, there is a need for a new and improved device having greater accuracy, application flexibility and durability.

SUMMARY

A mass flow rate meter according to the present invention includes one or more sensing elements that are exposed to fluid flow in a pipe or conduit. Each sensing element includes at least one first portion which senses aerodynamic (viscous) drag. This first portion may be either a curved (azimuthal) or straight arm which is coupled to, or an integral component of, a second portion or torque transfer arm. The most basic sensing element configuration includes a single arm or portion and a torque transfer arm or base portion. Other, preferred types of sensing elements are: a first type including a single curved (azimuthal) arm coupled to a torque transfer arm and a second type including two curved. i.e., outer and inner, (azimuthal) arms coupled to a single torque transfer arm. Preferably, the two curved (azimuthal) arms define larger and smaller concentric circle segments.

In a preferred embodiment, three of the first, single azimuthal arm sensing elements, occupying approximately 60°, alternate with three of the second, double azimuthal arm sensing elements, the outer arms occupying approximately 60° and the inner arms occupying approximately 120°. The torque transfer arm or base portion of each of the sensing elements extends through the pipe or conduit and includes an axial lever arm outside the pipe which engages a circumferential torque collecting ring or annulus. The ring, in turn, engages a fixed element or fin having one or more strain gauges affixed thereto.

As flow impinges upon the first and second curved azimuthal arms disposed in the flow stream, aerodynamic (viscous) drag is created and this force is carried by the torque transfer arms and the axial lever arms of the sensing elements to the torque collecting ring. The circumferential torque collecting ring or annulus thus applies force to the strain gauge(s).

Alternate methods of aerodynamic drag and flow sensing may be utilized such as sensing torque induced rotation of the torque collecting ring with a linear variable differential transformer (LVDT) or applying a measured counter-torque after deflection of the torque collecting ring with a servo-feedback system that returns the torque collecting ring to a null condition.

The output of the strain gauge(s), an LVDT or a servo-feedback system is conditioned and utilized to provide real time mass flow rate data. If desired, these data may be combined with a signal from a temperature sensor in the fluid flow to provide greater accuracy. The mass flow data may be accumulated (integrated) over time, if desired, to provide total mass flow per unit time.

It should be understood that the essential concept of the invention is that aerodynamic (viscous) drag on a sensing arm subjected to fluid flow in a conduit and attached to a transfer arm extending through the conduit wall will create torque or movement in the latter that can be calibrated to provide a measure of the mass flow rate in the conduit. Thus, at a minimum, a single sensing arm subjected to fluid flow in a conduit which is attached to a transfer arm that extends through the conduit wall and is coupled to a torque or motion sensing device embodies the invention. As described above and below, however, the invention may be embodied in many configurations of varying complexity for installation in pipes and conduits having diverse cross-sections.

Thus it is an aspect of the present invention to provide a meter for measuring the mass flow rate of a flowing fluid in a conduit It is a further aspect of the present invention to provide a device for measuring the mass flow rate of a fluid in a pipe or conduit.

It is a still further aspect of the present invention to provide a meter for measuring the mass flow rate of a fluid having at least one sensing element including a drag sensing portion and a torque transfer portion disposed in a fluid pipe or conduit.

It is a still further aspect of the present invention to provide a device for measuring the mass flow rate of a fluid in a pipe or conduit having at least one sensing element including azimuthal and radial portions disposed in a fluid pipe or conduit.

It is a still further aspect of the present invention to provide a meter for measuring the mass flow rate of a fluid having at least one sensing element having inner and outer azimuthal arms and at least one sensing element having one azimuthal arm.

It is a still further aspect of the present invention to provide a device for measuring the mass flow rate of a fluid having a plurality of sensing elements each having at least one curved azimuthal arm disposed in a fluid conduit and a radial portion which extends through the conduit and is operably coupled to a torque collecting ring.

It is a still further aspect of the present invention to provide a meter for measuring the mass flow rate of a fluid in a conduit having a first plurality of sensing elements having two curved azimuthal arms and a second plurality of sensing elements having one curved azimuthal arm, both pluralities of sensing elements including radial portions which extend through the conduit and are operably connected to a circumferential torque collecting ring.

It is a still further aspect of the present invention to provide a device for measuring the mass flow rate of a fluid having a first plurality of sensing elements having inner and outer curved azimuthal arms and a second plurality of sensing elements having only outer curved azimuthal arms, both pluralities of elements including radial portions which extend through a conduit and include axial portions which engage a circumferential torque collecting ring which applies force to one or more torque sensing devices.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
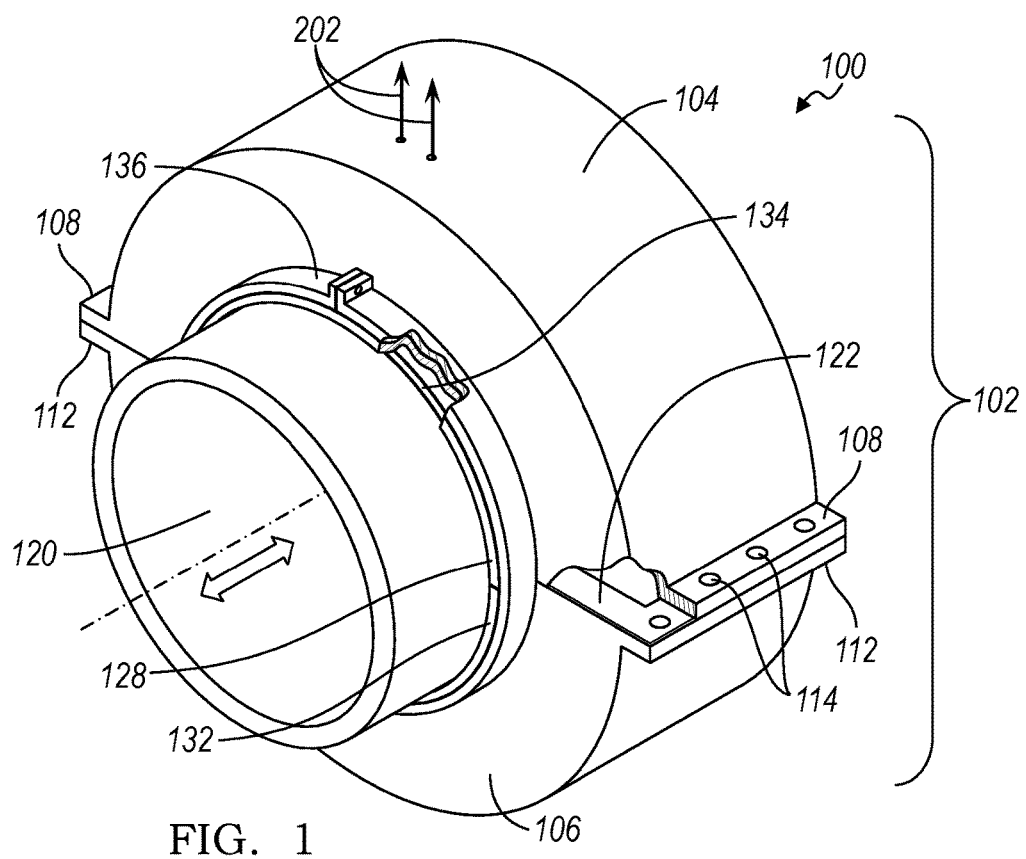
FIG. 1 is an exterior, perspective view of a mass flow rate meter or measuring device according to an exemplary embodiment.

Referring now to FIG. 1, a mass flow rate meter or measuring device according to the present invention is illustrated and generally designated by the reference number 100. The mass flow rate meter 100 includes a sealed, two piece outer housing 102 having a first semi-cylindrical shell 104 and a complementary second semi-cylindrical shell 106. Each of the shells 104 and 106 include opposing, axially extending flanges 108 and 112, respectively. A plurality of threaded fasteners 114, such as bolts and nuts, removably secure the shells 104 and 106 together and in place on a pipe or conduit 120. Gaskets or resilient seals 122 are disposed between the flanges 108 and 112 as well as along the opposed edges 124 of the shells 104 and 106 to provide a fluid tight seal therebetween. Each end face of the shells 104 and 106 also includes a thin semi-circular projection 128 and 132, respectively, having an inside diameter just slightly larger than the outside diameter of the pipe or conduit 120. An O-ring seal 134 is disposed between the inside of each of the semi-circular projections 128 and 132 and the conduit 120. The O-rings 134 are compressed and the mass flow rate meter 100 is secured to and retained in position on the conduit 120 by a pair of front and rear clamping bands 136. Only the front clamping band 136 is illustrated in FIG. 1. The bi-directional arrow appearing in the conduit 120 is an acknowledgement and indication that the mass flow rate meter 100, as well as the other embodiments disclosed herein, functions with and measures fluid flow in either direction.

Figure 2:
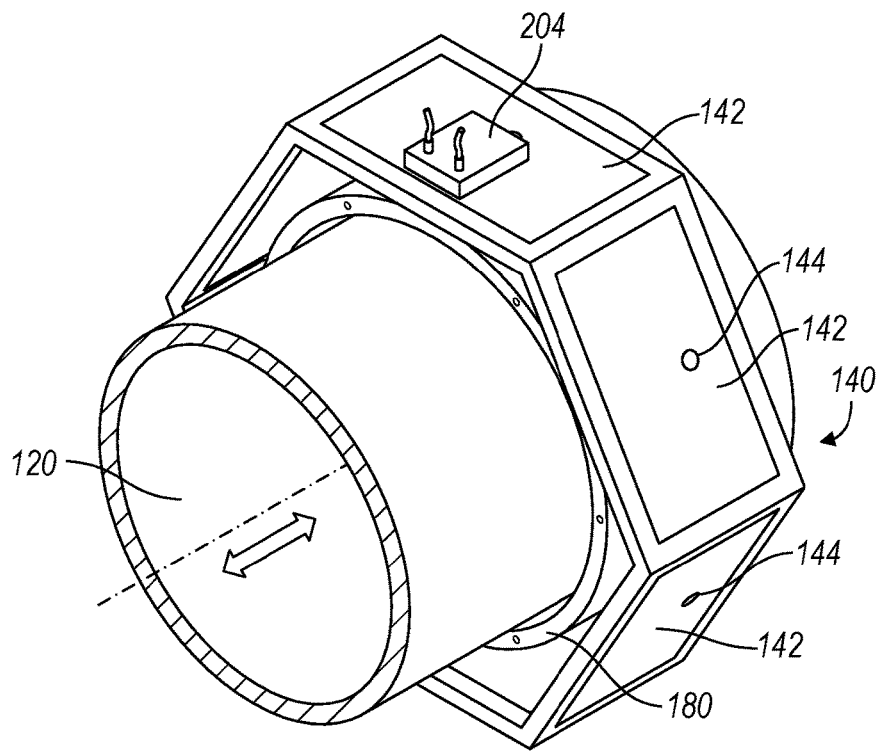
FIG. 2 is a perspective view of a mass flow rate meter or measuring device according to an exemplary embodiment with the outer fluid tight housing removed.
Figure 3:
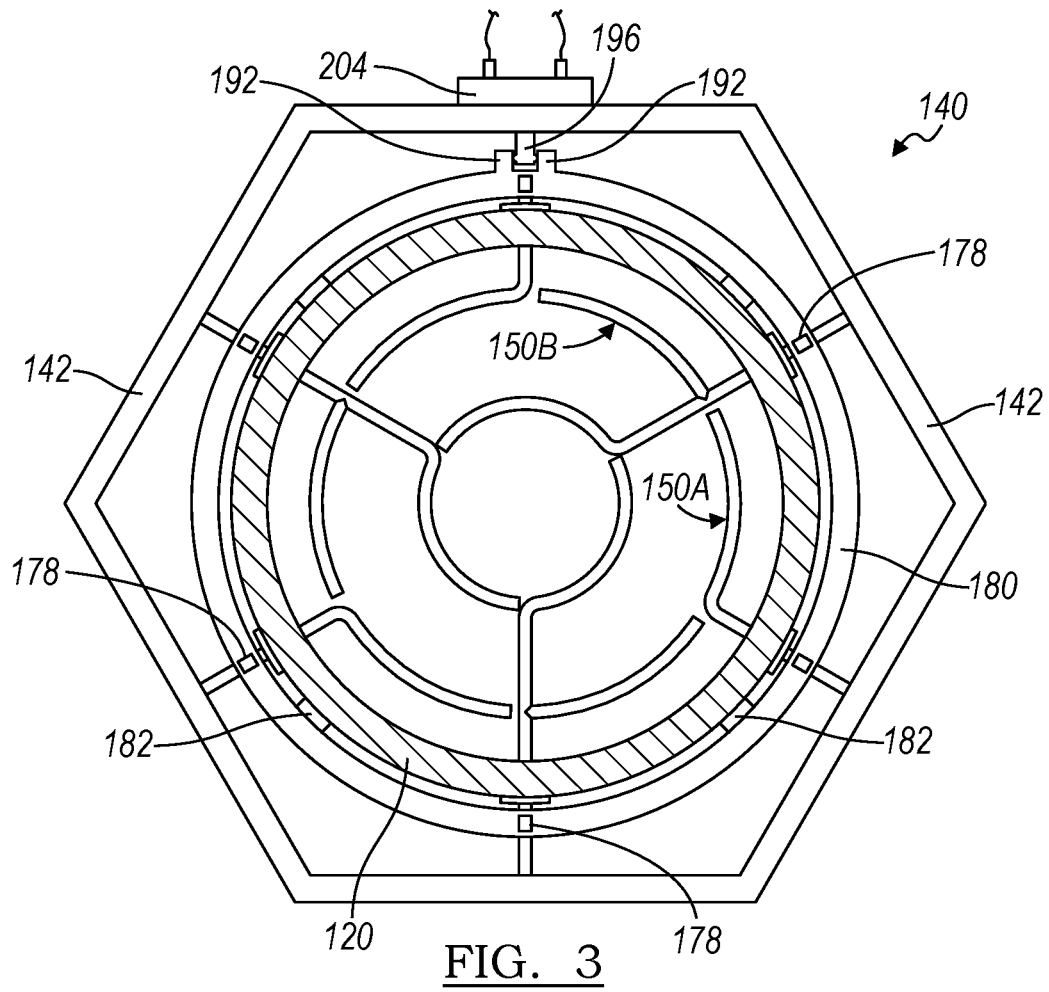
FIG. 3 is an enlarged, end elevational view in partial section of a mass flow rate meter or measuring device according to an exemplary embodiment.
Figure 4:
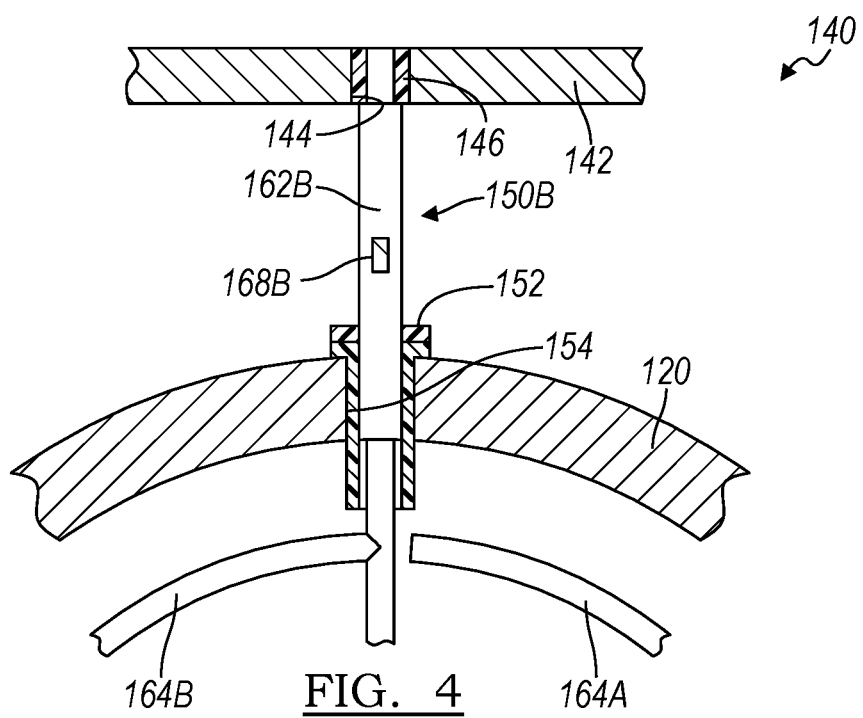
FIG. 4 is an enlarged, fragmentary view of the sensing element bearings of a mass flow rate meter or measuring device according to an exemplary embodiment.

Referring now to FIGS. 2, 3 and 4, the mass flow rate meter 100 also includes an inner, hexagonal housing or frame 140 which surrounds the conduit 120 and which is fully contained within the outer housing 102. The hexagonal frame 140 includes six preferably flat equal size plates or panels 142, each occupying 60° of arc about the conduit 120. Each of the plates or panels 142 includes a through, perpendicular bearing opening 144 having an axis which coincides with a line of radius of the conduit 120 at the circumferential mid-point of the plate or panel 142. Each of the bearing openings 144 includes a friction reducing outer bearing insert 146 which receives, positions and rotatably supports one of six flow sensing elements 150A and 150B which will be described in greater detail below. Each of the sensing elements 150A and 150B is also positioned and rotatably supported by a friction reducing inner bearing insert 152 disposed in a radial opening 154 in the conduit 120. For ease of assembly, the inner bearing inserts 152 may comprise two pieces, i.e., be split longitudinally into two identical halves.

It should be understood that while it is desirable to utilize outer and inner bearings 146 and 154 selected more for their low friction characteristics than their sealing ability, which thus necessitates the utilization of the outer housing 102, certain low pressure applications may utilize inner bearings 154 which provide suitable fluid tight seals and exhibit low friction, thus obviating the need for the outer housing 102. Such an embodiment is illustrated and described below with reference to FIG. 8.

Figure 5:
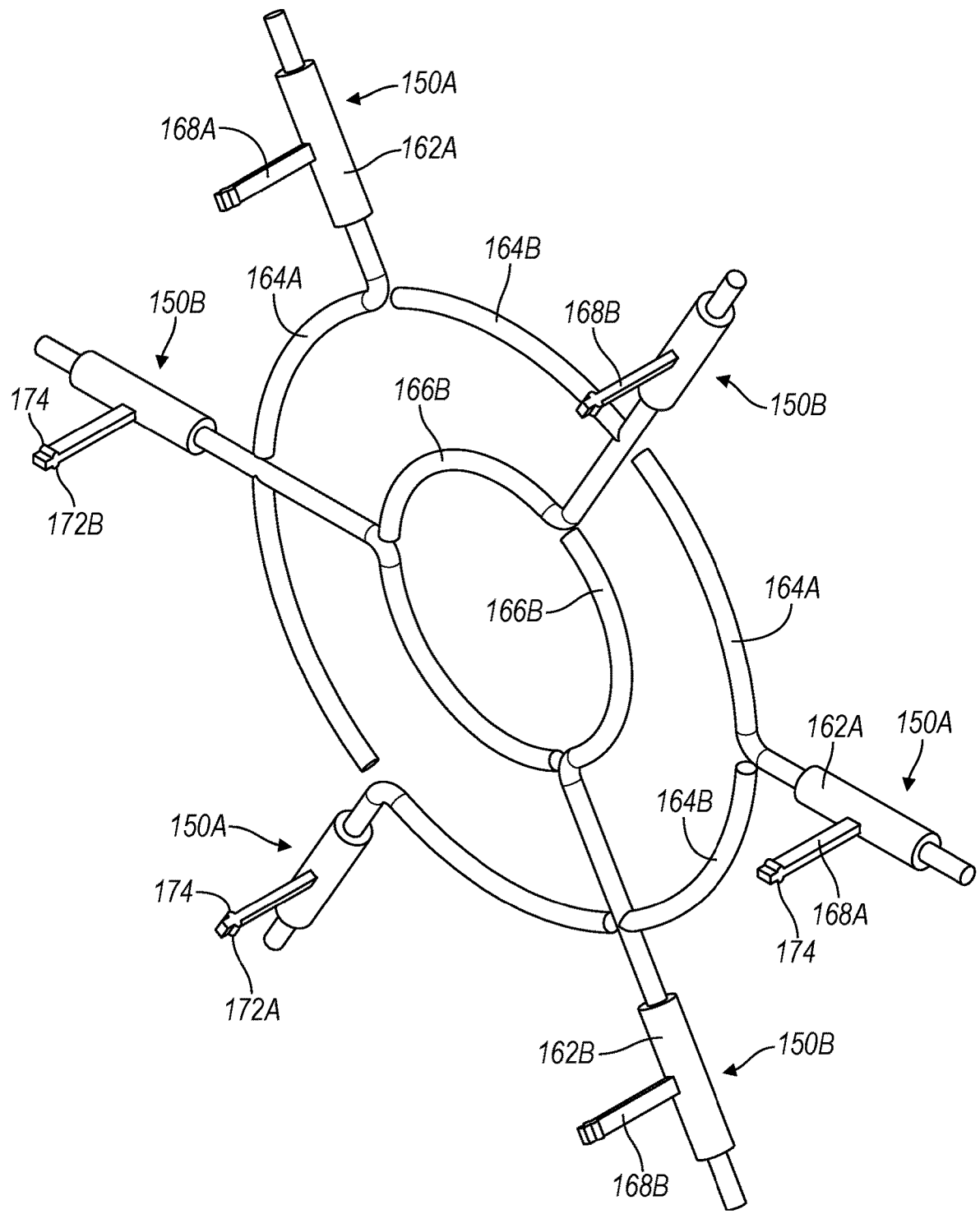
FIG. 5 is a spatial, perspective view of an array of sensing elements having first azimuthal arms alternating with sensing elements having first and second azimuthal arms of a mass flow rate meter or measuring device according to an exemplary embodiment.

Referring now to FIGS. 4 and 5, the array of six flow sensing elements will be described. The six sensing elements are of two types or configurations: three of the sensing elements, designated 150A, are arranged at 120° intervals and include a radial torque transfer arm or base portion 162A which is rotatably received within the outer bearing insert 146 and the inner bearing insert 152 and only a single, curved (radiused) outer azimuthal arm 164A extending approximately 60°. Each of the sensing elements 150A also includes an axial lever arm 168A which is oriented perpendicularly to the plane containing the torque transfer arm 162A and the outer azimuthal arm 164A.

Alternating with, i.e., interleaved with, the three sensing elements 150A having the single, outer azimuthal arm 164A are an additional three sensing elements designated 150B which are also arranged at 120° intervals and include a radial torque transfer arm or base portion 162B which is rotatably received within the outer and inner bearing inserts 146 and 152, respectively, an outer, curved (radiused) azimuthal arm 164B extending approximately 60° and an inner, curved (radiused) azimuthal arm 166B extending approximately 120°. Each of the sensing elements 150B also includes an axial lever arm 168B which is oriented perpendicularly to the plane containing the torque transfer arm 162B and the outer and inner azimuthal arms 164A and 166B. Preferably, the sensing elements 150A and 150B are shaped metal rods having a circular cross-section.

It will be appreciated that the utilization of six sensing elements (three elements 150A having a single outer azimuthal arm 164A alternating with three elements 150B having an outer azimuthal arm 164B and an inner azimuthal arm 166B) is an exemplary embodiment. However, as noted elsewhere in this document, other configurations and numbers of sensing elements as well as the use (or omission of) and the number of frame panels 142 such as one, two, three, four, eight or more, is entirely within the purview of this invention, the only constraint being that the number of azimuthal arms, for example, 164A, 164B and 166B must be greater than or equal to the number of torque transfer arms or base portions 162A and 162B.

Figure 6:
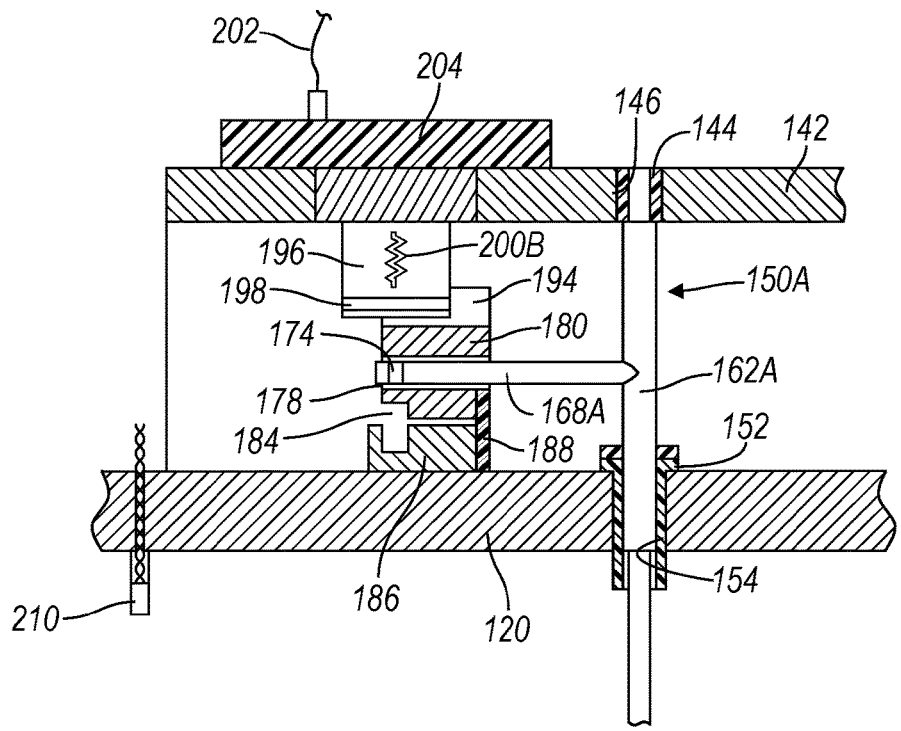
FIG. 6 is an enlarged, fragmentary view of a torque collection ring, torque collection ring support assembly and strain gauge of a mass flow rate meter or measuring device according to an exemplary embodiment.

Referring now to FIGS. 3, 5 and 6, each of the lever arms 168A and 168B include an enlarged terminal portion 172A and 172B, respectively, having a projecting, radially extending surface or edge 174. The radial edges 174 provide line contact and engage the sidewalls of axial rectangular openings or channels 178 in an annular torque collecting ring 180. The torque collecting ring 180 is rotatably supported by a plurality, preferably at least four, low friction bearings 182 disposed at equal 90° intervals thereabout and preferably fabricated of polytetrafluoroethylene (PTFE). The bearings 182 are received within a circumferential channel 184, an outer portion of which is defined by the torque collecting ring 180 and an inner portion of which is defined by a circumferential band or annulus 186 secured to and extending around the conduit 120. Radial alignment of the torque collection ring 180 and the circumferential band 186 is maintained by the bearings 182 and a flat PTFE washer 188 which extends 360° around the torque collecting ring 180 and the circumferential band 186 and is secured thereto. If desired, an additional PTFE washer (not illustrated) may be disposed on the left face (as viewed in FIG. 6) of the torque collecting ring 180.

Figure 7:
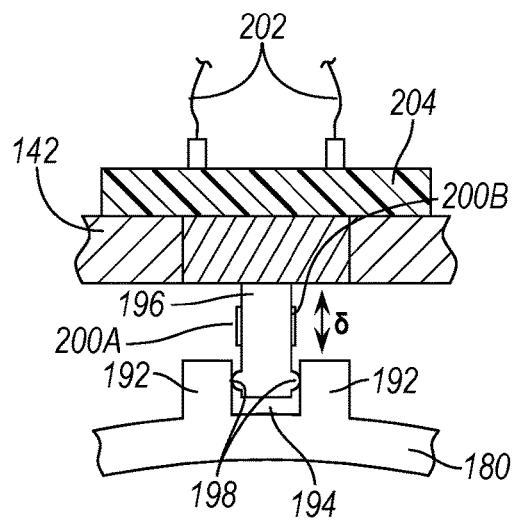
FIG. 7 is an enlarged, fragmentary view of a torque collection ring and strain gauge interface of a mass flow rate meter or measuring device according to an exemplary embodiment.

Referring to FIGS. 3, 6 and 7, preferably at the top, 12 o'clock position, of the torque collecting ring 180 reside a pair of lugs or projections 192 which define a channel 194 which receives a torque transducer mounting block or fin 196. The torque transducer mounting block or fin 196 is secured to the adjacent top plate or panel 142 of the inner housing 140 and includes a pair of semi-cylindrical projections 198, one on each face of the mounting block or fin 196, to achieve line contact between the fin 196 and the lugs or projections 192 of the torque collecting ring 180 at a distance δ from the panel 142 of the frame 140. Attached to one or both faces of the mounting block or fin 196 are one or a pair of strain gauges 200A and 200B. When a pair of strain gauges 200A and 200B are configured as illustrated, i.e., on opposing faces of the mounting block or fin 196, it will be appreciated that the strain gauges 200A and 200B will be in a "push-pull" configuration, i.e., one will be in compression while the other one will be in tension and vice versa.

The output(s) of the strain gauges 200A and 200B are carried in electrical conductors 202 which pass through an insulating block 204. As illustrated in FIG. 6, the mounting block or fin 196 defines an axial length that can be increased to increase its rigidity (decrease its flexibility) or decreased to decrease its rigidity (increase its flexibility) to adjust the operating range of the strain gauges 200A and 200B and the mass flow meter 100. Finally and optionally, in order to improve the measurement of the mass flow rate of a fluid through the conduit 120, an electrical temperature measurement device such as a thermistor 210 may be disposed in the conduit 120 to provide real time measurement of fluid temperature.

Figure 8:
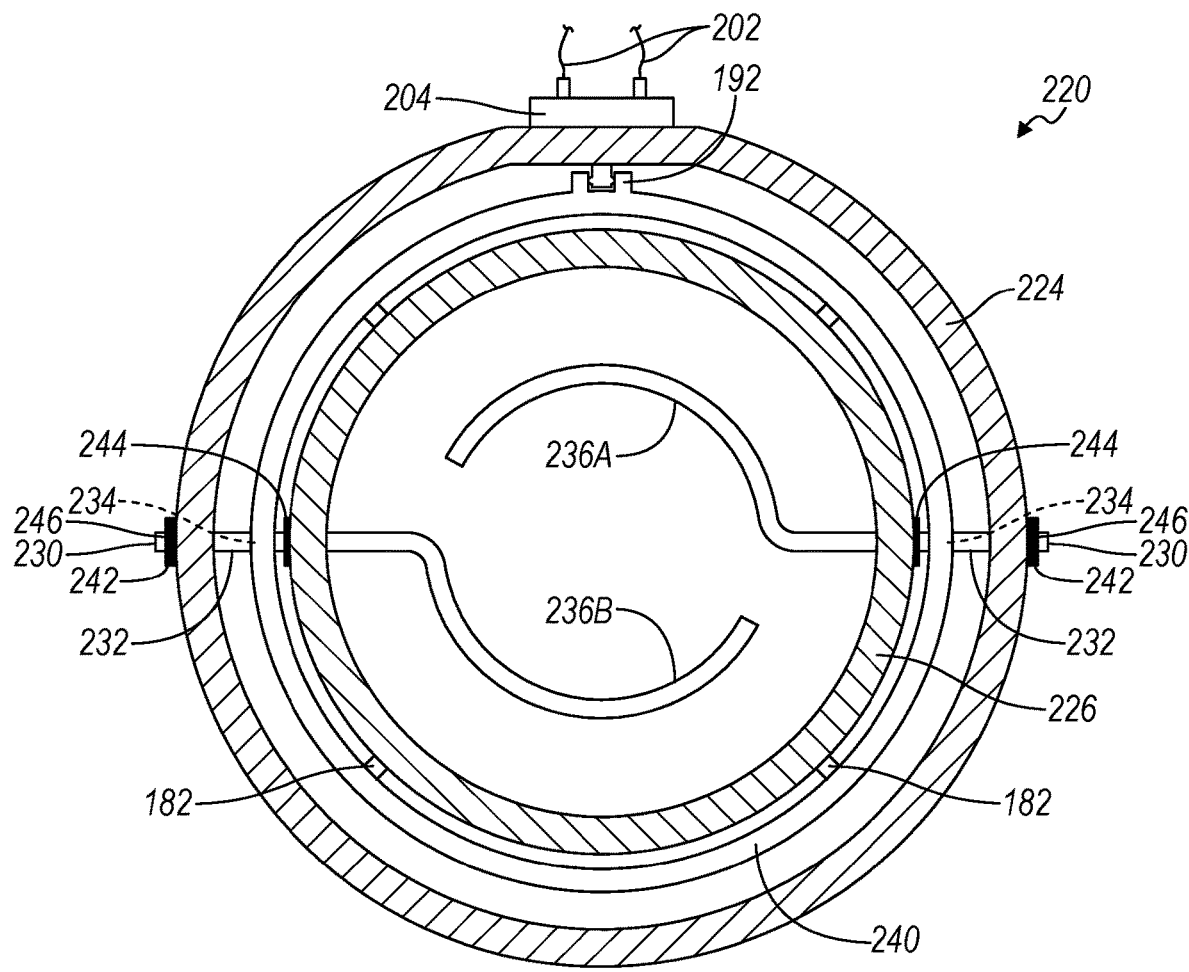
FIG. 8 is an end, elevational view in partial section of a first alternate embodiment of a mass flow rate measuring device according to the present invention having a pair of azimuthal arms.

FIG. 8 presents a first alternate embodiment mass flow rate meter 220 according to the present invention. First of all, the alternate embodiment mass flow rate meter 220, which is generally intended for lower pressure operation, i.e., below approximately 100 p.s.i., dispenses with the sealed two piece outer housing 102. Rather than utilizing an inner frame 140 having multiple flat panels 142, the first alternate embodiment mass flow meter 220 utilizes a housing 224 which is cylindrical and which is disposed concentrically about a cylindrical fluid conduit or pipe 226. In addition, rather than utilize six sensing elements 150A and 150B, the first alternate embodiment mass flow meter 220 utilizes only two sensing elements 230. Each of the two sensing elements 230 includes a torque transfer (radial) support arm or portion 232, an axial lever arm or portion 234 and one azimuthal arm 236A and 236B.

As illustrated in FIG. 5, the ends of the axial lever arms 234 are configured like the axial lever arms 168A of the preferred embodiment 100, that is, they include the enlarged terminal portions 172A and the edges 174 to provide line contact with a torque collecting ring 240. The torque collecting ring 240 is supported in bearings 182 as illustrated in FIGS. 3 and 6.

The torque transfer (radial) arms or base portions 232 of the two sensing elements 230 are received within radially oriented bearings, a first pair of low friction bearings 242 disposed in diametric opposition in the wall of the cylindrical housing 224 and a second pair of fluid tight bearings 244 disposed in the wall of the fluid conduit 226 and in radial alignment with the first pair of bearings 242. If desired, circular flats 246 may be ground or milled on the outer, inner or both surfaces of the housing 224 to improve the mounting, stability and alignment of the bearings 242.

As noted above, the terminal portions 172A of the torque transfer arms 168A engage and transfer torque to the torque collecting ring 240. The torque collecting ring 240 cooperates with an assembly that is the same as the assembly illustrated in FIG. 6. With reference thereto, the torque collecting ring 240 of the first alternate embodiment 220, like the torque collecting ring 180 of the first embodiment 100, includes a pair of lugs or projections 192 which define a channel 194 which receives a torque transducer mounting block or fin 196. The torque transducer mounting block or fin 196 is secured, in the first embodiment 100, to the adjacent top plate or panel 142 of the inner housing 140 and in the alternate embodiment 220 to the cylindrical housing 224.

The mounting block or fin 196 includes a pair of semi-cylindrical projections 198, one on each face of the mounting block or fin 196, to achieve line contact between the mounting block or fin 196 and the lugs or projections 192 of the torque collecting rings 180 and 240 at a distance δ from the panel 142 of the frame 140 or the cylindrical housing 240, respectively. Attached to one or both faces of the fin 196 are one or a pair of strain gauges 200A and 200B. When a pair of strain gauges 200A and 200B are configured as illustrated, i.e., on opposing faces of the mounting block or fin 196, it will be appreciated that one strain gauge 200A will be in compression while the other one, 200B, will be in tension and vice versa. The output(s) of the strain gauge(s) 200A and 200B are carried in electrical conductors 202 which pass through an insulating mounting block 204.

Figure 9:
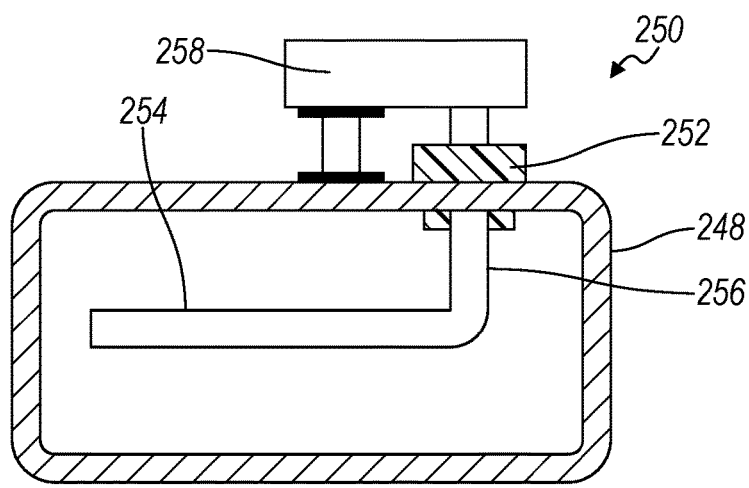
FIG. 9 is an end, elevational view in partial section of a second alternate embodiment of a mass flow rate measuring device according to the present invention having a single sensing arm.

Those skilled in the art will understand that the exemplary embodiment 100 illustrated in FIGS. 1 through 7 represents a sophisticated and highly accurate mass flow rate measuring device. However, and as stated above, the essential concept and its mass flow rate measuring capability can be embodied in a device having a single sensing arm disposed in a conduit of any cross-section, as Illustrated in FIG. 9. Here, a conduit 248 which is illustrated as rectangular but which may have more or fewer sides and be of different proportions has a single sensing element 250 extending through a sealed bearing 252 in the sidewall of the conduit 248. The sensing element 250 includes a straight arm or portion 254 disposed in a plane oriented perpendicularly to the axis of fluid flow. Fluid flow in either direction in the conduit 248 creates aerodynamic (viscous) drag on the straight arm or portion 254 and a base arm or portion 256 carries the resulting torque through the sealed bearing 252 in the sidewall of the conduit 248 to a torque sensing device 258 such as one or a pair of strain gauges, a linear variable differential transformer as stated above and explained in connection with FIG. 11 or a counter torque applying servo-feedback system as stated above and explained in connection with FIG. 12.

Figure 10:
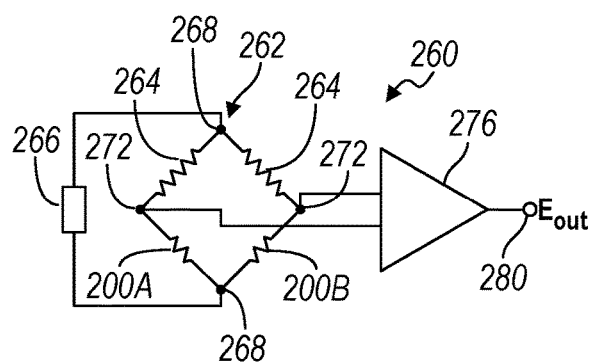
FIG. 10 is a schematic diagram of a circuit for utilizing an output from a pair of strain gauges of a mass flow rate measuring device according to an exemplary embodiment which provides mass flow rate data signal.

Referring now to FIG. 10, it illustrates typical and exemplary circuitry 260 associated with the mass flow meter 100 including a Wheatstone bridge 262. The circuitry 260 includes the two strain gauges 200A and 200B disposed on opposite sides of the mounting block or fin 196 which function as two variable resistance elements in two legs of the Wheatstone bridge 262. See FIGS. 6 and 7. The other two legs of the bridge 262 are two fixed resistors 264 having equal resistance nominally in the middle of the resistance range of the strain gauges 200A and 200B. A power supply 266 provides a constant voltage to two junctions 268 of the bridge 262. From the other two junctions 272 of the bridge 262, a varying signal is provided to a comparator or amplifier 276 which provides an output signal at 280. It should be appreciated that other circuits such as resistance and voltage scaling circuits and devices may also be driven by the strain gauges in certain other and diverse applications to provide real time mass flow data.

Figure 11:
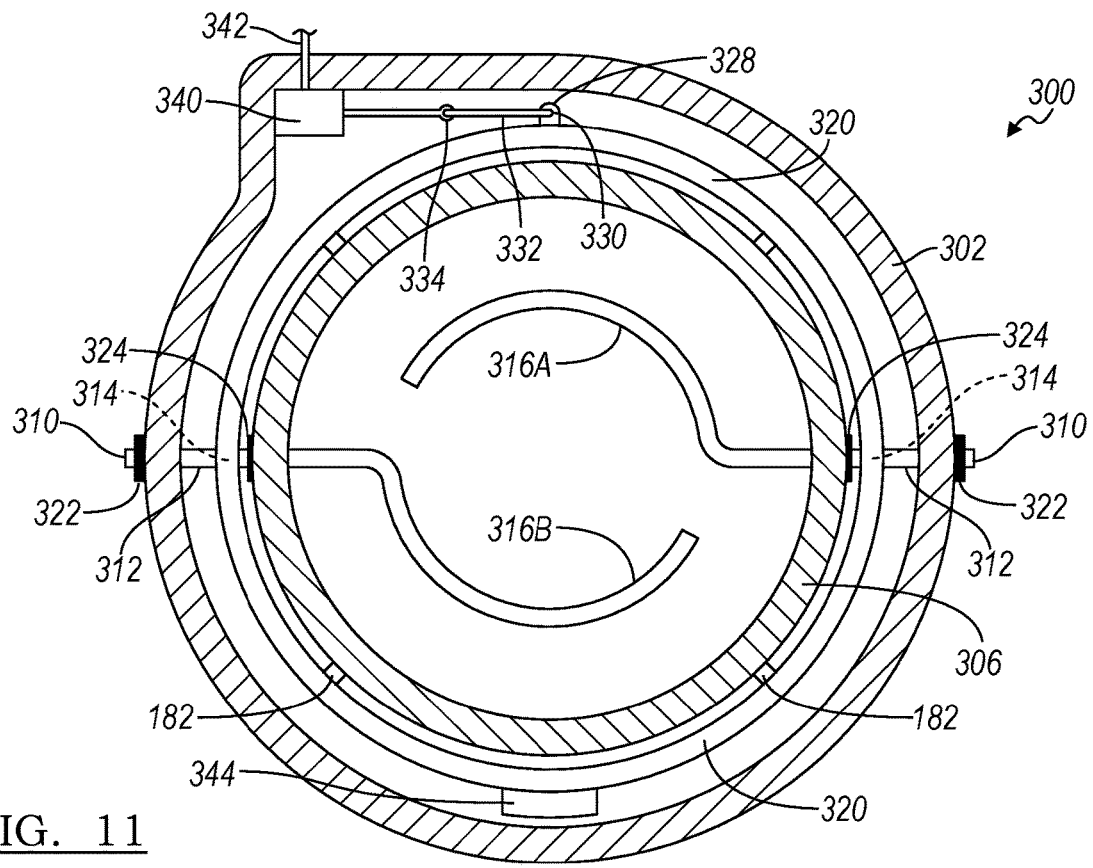
FIG. 11 is an end, elevational view in partial section of a third alternate embodiment of a mass flow rate measuring device according to the present invention having a pair of azimuthal arms and utilizing a linear variable differential transformer.

Referring now to FIG. 11, a third alternate embodiment of the mass flow rate meter according to the present invention is illustrated and generally designated by the reference number 300. The mass flow rate meter 300, like the first alternate embodiment mass flow rate meter 220, is generally intended for lower pressure operation, i.e., below approximately 100 p.s.i. Accordingly, it too dispenses with the sealed two piece outer housing 102 and the inner frame 140 having multiple flat panels 142. The third alternate embodiment mass flow meter 300 utilizes a housing 302 which is cylindrical and which is disposed concentrically about a cylindrical fluid conduit or pipe 306. The third alternate embodiment mass flow meter 300 preferably utilizes two sensing elements 310. Each of the two sensing elements 310 includes a torque transfer arm or base portion 312, an axial lever arm or portion 314 and one curved, azimuthal arm 316A and 316B, both preferably defining the same radius. It will be appreciated that the third embodiment mass flow meter 300 may utilize and be configured with six sensing elements like the preferred embodiment 100 illustrated in FIG. 3 or other numbers of sensing elements, as desired.

As illustrated in FIG. 5, the ends of the axial lever arms 314 are configured like the axial lever arms 168A of the preferred embodiment 100, that is, they include the enlarged terminal portions 172A and the edges 174 to provide line contact with a torque collecting ring 320. The torque collecting ring 320 is supported in a plurality of bearings 182 as illustrated in FIGS. 3 and 6.

The torque transfer (radial) arms or base portions 312 of the two sensing elements 310 are received within radially oriented bearings, a first pair of low friction bearings 322 disposed in diametric opposition in the wall of the cylindrical housing 302 and a second pair of fluid tight bearings 324 disposed in the wall of the fluid conduit 306 and in radial alignment with the first pair of bearings 322. If desired, circular flats (not illustrated) may be ground or milled on the outer, inner or both surfaces of the housing 302 to improve the mounting, stability and alignment of the bearings 322.

As noted above, the terminal portions 172A of the axial lever arms 314 engage and transfer torque to the torque collecting ring 320. At the top of the torque collecting ring 320 is disposed a lug or projection 328 defining a through opening 330. Disposed within the opening 330 is a captive, terminal portion of a generally tangentially oriented motion transfer link 332. The motion transfer link 332 includes a pivot or hinge 334 which accommodates axial mis-alignment and is coupled to a linear variable differential transformer (LVDT) 340 disposed within and secured to the housing 302. Thus, rotation of the torque collecting ring 320 and movement of the motion transfer link 332 is sensed by the LVDT 340. The LVDT 340 is conventional and exciting voltage and sensed data are carried to and from the LVDT in a multiple conductor cable 342.

The torque collecting ring 320, at bottom dead center (BDC), includes a weight 344, typically of several ounces, that provides a restoring or centering force to the torque collecting ring 320 when it moves clockwise or counter-clockwise away from a centered or null position due to sensed aerodynamic drag and rotation of the torque transfer arms 312 and axial lever arms 314.

Several details of the third alternate embodiment mass flow rate meter 300 should be noted. First of all, this embodiment of the mass flow rate meter is position sensitive. That is, in order to achieve accurate bi-directional mass flow rate sensing, the device must be installed with the weight 344 at the bottom dead center, i.e., six o'clock position, when there is zero flow. Second of all, whereas the previously described embodiments of the mass flow rate meter sense torque and force, with negligible movement of the torque collecting ring, the third embodiment 300 senses actual rotation of the torque collecting ring 320 utilizing the LVDT sensor 340. Such rotation is typically on the order of plus or minus (clockwise or counter-clockwise) 5° to 10° and a maximum of plus or minus 8° has been found to be preferable. In order to operate within this preferred maximum range of rotation, the mass of the weight 344 may be adjusted so that maximum encountered flow rate creates rotation of the torque collecting ring 320 of approximately 8°. Last of all, in order to achieve bi-directional fluid flow measurement, the armature of the LVDT sensor 340 must be in its mid-position with zero fluid flow. With an AC bridge and a built in A to D converter, a DC output voltage that is nominally linear with armature displacement is provided. Accordingly, the voltage output is proportional to fluid flow rate.

Figure 12:
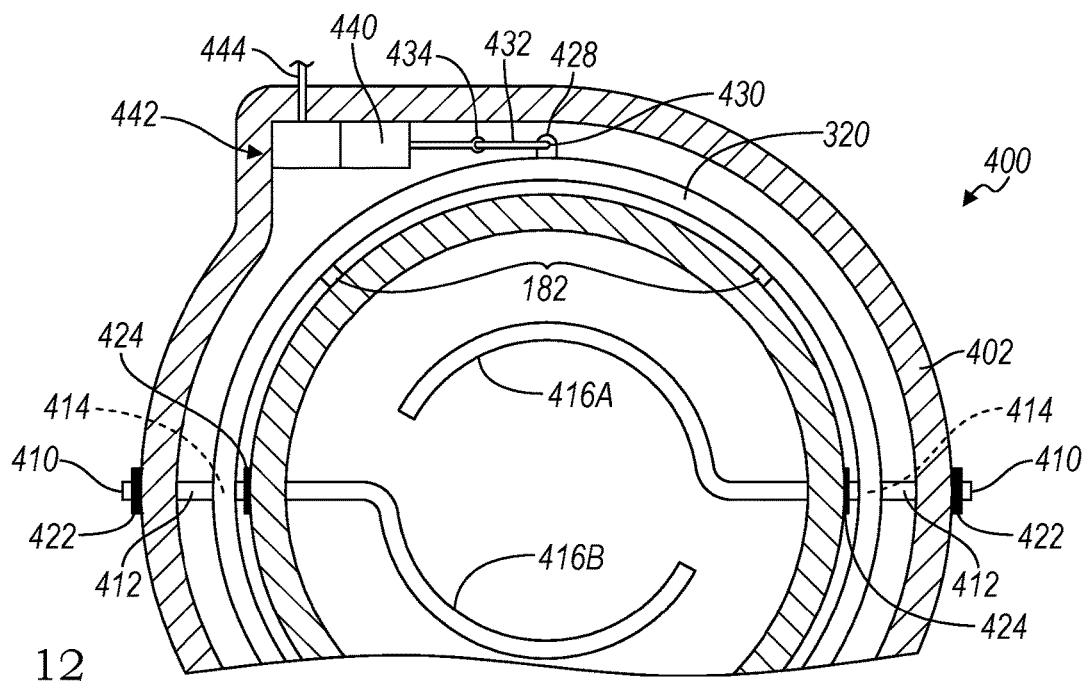
FIG. 12 is a fragmentary, end elevational view in partial section of a fourth alternate embodiment of a mass flow rate measuring device according to the present invention having a pair of azimuthal arms and utilizing a servo feedback flow sensing system.

Referring now to FIG. 12, a fourth alternate embodiment of the mass flow rate meter according to the present invention is illustrated and generally designated by the reference number 400. The mass flow rate meter 400, like the third alternate embodiment mass flow rate meter 300, is generally intended for lower pressure operation, i.e., below approximately 100 p.s.i. The fourth alternate embodiment mass flow rate meter 400 utilizes a housing 402 which is cylindrical and which is disposed concentrically about a cylindrical fluid conduit or pipe 406. The fourth alternate embodiment mass flow rate meter 400 preferably utilizes two sensing elements 410. Each of the two sensing elements 410 includes a torque transfer arm or base portion 412, an axial lever arm or portion 414 and a respective curved azimuthal arm 416A and 416B, both preferably defining the same radius. It will be appreciated that the fourth embodiment mass flow rate meter 400 may utilize and be configured with six sensing elements like the preferred embodiment 100 illustrated in FIG. 3 or other numbers of sensing elements, as desired.

As illustrated in FIG. 5, the ends of the axial lever arms 414 are configured like the axial lever arms 168A of the preferred embodiment 100, that is, they include the enlarged terminal portions 172A and the edges 174 to provide line contact with a torque collecting ring 420. The torque collecting ring 420 is supported in a plurality of bearings 182 as illustrated in FIGS. 3 and 6.

The torque transfer (radial) arms or base portions 412 of the two sensing elements 410 are received within radially oriented bearings, a first pair of low friction bearings 422 disposed in diametric opposition in the wall of the cylindrical housing 402 and a second pair of fluid tight bearings 424 disposed in the wall of the fluid conduit 406 and in radial alignment with the first pair of bearings 422. If desired, circular flats (not illustrated) may be ground or milled on the outer, inner or both surfaces of the housing 402 to improve the mounting, stability and alignment of the bearings 422.

As noted above, the terminal portions 172A of the axial lever arms 414 engage and transfer torque to the torque collecting 420. At the top of the torque collecting ring 420 is disposed a lug or projection 428 defining a through opening 430. Disposed within the opening 430 is a captive, terminal portion of a generally tangentially oriented motion transfer link 432. The motion transfer link 432 includes a pivot or hinge 434 which accommodates axial mis-alignment and is coupled to a servo controller 440 of a null seeking servo feedback assembly 442 disposed within and secured to the housing 402. As torque is applied to the torque collecting ring 420 due to sensed aerodynamic drag and rotation of the torque transfer arms 412 and axial lever arms 414 and it begins to move off a null position, the servo controller 440 of the servo feedback assembly 442 applies a counter-force which restores or returns the torque collecting ring 420 to its null position. The magnitude of the electrical signal generated by the servo feedback assembly 442 to achieve this null position corresponds to the mass flow rate in the conduit or pipe 406 and such electrical signal as well as exciting voltage are carried to and from the servo feedback assembly 442 in a multiple conductor cable 444.

Theory and Relevant Mathematical Equations

The azimuthal arms 164A, 164B and 166B and the radial arms 162A and 162B will be treated herein as a unit. Hence, their diameters ($\lambda$) can be in proportion to the inside radius of the conduit 120: R. ($\lambda$=kR, wherein k is nominally equal to 0.1). The inner azimuthal arms 166B and the outer azimuthal arms 164A and 164B can be centered at equal area segments. Selecting three segments in the domain: 0<r<R and 0<$\theta$<2$\pi$/3 results in the inner azimuthal arm 166B at $r_1'$=R/$\sqrt{6}$ and the outer azimuthal arm 164B at $r_2'$=$\sqrt{(2/3)}$. The torque on a respective radial support arm 162A or 162B from its outer azimuthal arm 164B at $r_2'$ (j=2) or from its inner azimuthal arm 166B at $r_1'$ (j=1) is equal to:

$$T(j) = \int_0^{\theta_j} r_j' \sin\theta C\lambda\rho(U^2/2) r_j' d\theta \quad (1)$$

where the upper limit on $\theta$ (that is, $\theta_j$) is understood to be 2$\pi$/3 for the inner azimuthal arm 166B (j=1) and $\pi$/3 for the outer azimuthal arms 164A and 164B (j=2). Similarly, $r_j$ depends on the j=1 or 2 designation in the integral. Assuming that $\rho$ and U are independent from j, the integral can be recast as:

$$T(j) = \lambda r_j^2 (0.5) U_0^2 C\rho \int_0^{\theta_j} \sin\theta d\theta \quad (2)$$

where the upper limit on $\theta$ is 2$\pi$/3 if j=1 and $r_1$=R/$\sqrt{6}$ and $\theta$=$\pi$/3 if $r_2$=R$\sqrt{2/3}$). Let M represent the collection of terms that multiply the product: ($r_j^2$ x integral) and note that C=f($U_0\lambda$/v) where the bracketed term represents the Reynolds number for the flow past the cylindrical azimuth arm. The definite integrals have numerical values of 1.5 for j=1 and 0.5 for j=2. There are three segments of span: 2$\pi$/3. Each segment contributes one j=1 torque and two j=2 torques.

Hence, a given segment contributes $M[(R^2/6)1.5+2\ R^2(2/3)(0.5)]=MR^2[0.25+0.667]=0.917R^2$. The total torque applied to the torque collecting ring 180 is thus $2.75MR^2$. If these, or similar, proportional dimensions are used for the design of the mass flow meter 100, then the calibration of any mass flow meter 100: total torque=f (mass flow rate) will only be a function of the Reynolds number $<U_0>R/v$.

The foregoing description of the present invention is merely exemplary in nature and variations that do not depart from the gist of the present disclosure and invention are intended to be within the scope of the present disclosure. Such variations are not to be regarded as a departure from the spirit and scope of the present invention.

What is claimed is:

1. A mass flow rate measuring device comprising, in combination,
    a sensing element having a torque transfer arm adapted and configured to extend through a sidewall of a conduit and a sensing arm extending from said torque transfer arm and adapted and configured to sense a fluid flow in such conduit, and
    a torque sensing device coupled to said torque transfer arm,
    whereby fluid flow impinging upon said sensing arm moves said sensing arm and said torque transfer arm and such movement is sensed by said torque sensing device.

2. The mass flow rate measuring device of claim 1, wherein said conduit is a circular pipe and said torque transfer arm is radially oriented.

3. The mass flow rate measuring device of claim 1, further including a second sensing element having a sensing arm and a torque transfer arm, said torque transfer arm also operably coupled to said torque sensing device.

4. The mass flow rate measuring device of claim 3, further including a torque collecting ring disposed about said conduit, said sensing elements and said torque sensing device operably coupled to said torque collecting ring.

5. The mass flow rate measuring device of claim 1, wherein said conduit includes a fluid tight bushing for receiving said torque transfer arm of said sensing element, said bushing disposed in an opening in said sidewall of said conduit.

6. The mass flow rate measuring device of claim 1, further including a thermistor exposed to said fluid flow in said conduit for sensing a temperature of such fluid flow in said conduit.

7. The mass flow rate measuring device of claim 1, wherein said torque sensing device includes a torque collecting ring and one of a strain gauge, an LVDT and a servo controller operably coupled to said torque collecting ring.

8. A mass flow rate measuring device comprising, in combination,
    at least one first sensing element having one curved fluid sensing arm extending from a torque transfer arm and a lever arm extending from said torque transfer arm,
    at least one second sensing element having at least one curved fluid sensing arm extending from a torque transfer arm and a lever arm extending from said torque transfer arm,
    a torque collecting ring engaged by said lever arms of said first and second elements,
    at least one torque sensing device operably coupled to said torque collecting ring,
    whereby torque generated by aerodynamic drag created by fluid flow past said curved sensing arms of said first and second sensing elements is transferred to said collecting ring and applied to said torque sensing device.

9. The mass flow rate measuring device of claim 8 wherein said at least one second sensing element includes two curved fluid sensing arms, one of said two curved fluid sensing arms having a larger radius than another of said two curved fluid sensing arms.

10. The mass flow rate measuring device of claim 9 wherein said curved fluid sensing arm of said at least one first sensing element defines a first radius and one of said two curved fluid sensing arms of said at least one second sensing element defines a first radius equal to said first radius of said curved fluid sensing arm of said at least one first sensing element and another of said two curved fluid sensing arms of said at least one second sensing element defines a second radius smaller than said first radius.

11. The mass flow rate measuring device of claim 8 wherein said torque sensing device is a servo controller of a servo feedback assembly operably coupled to said torque collecting ring.

12. The mass flow rate measuring device of claim 8 wherein said torque collecting ring includes an axial channel and said at least one torque sensing device is a strain gauge mounted on a fin disposed in said channel.

13. The mass flow rate measuring device of claim 8 wherein said torque collecting ring includes a weight and said at least one torque sensing device is a linear variable differential transformer operably coupled to said torque collecting ring.

14. The mass flow rate measuring device of claim 8 including a conduit and three first sensing elements interleaved with three second sensing elements having at least two curved sensing elements disposed within said conduit.

15. A mass flow rate meter comprising, in combination,
    a housing,
    a first plurality of sensing elements having one curved fluid sensing arm extending from a torque transfer portion and a lever arm extending from said torque transfer portion, said torque transfer portions of each of said first plurality of sensing elements supported in said housing,
    a second plurality of sensing elements interleaved with said first plurality of sensing elements, said second plurality of sensing elements having two curved fluid sensing arms extending from a torque transfer portion and a lever arm extending from said torque transfer portion, said torque transfer portions of each of said second plurality of sensing elements supported in said housing,
    a torque collecting ring engaged by said lever arms of said first and said second pluralities of sensing elements, and
    at least one torque sensing device supported by said housing and acted upon by said torque collecting ring.

16. The mass flow rate meter of claim 15, further including a fluid conduit adapted to receive said curved sensing arms of said first and said second pluralities of sensing elements and including openings for receiving said torque transfer portions of said first and said second pluralities of sensing elements.

17. The mass flow rate meter of claim 16, wherein said radial portions of said first and second pluralities of said sensing elements are supported on bearings in said housing and in said fluid conduit.

18. The mass flow rate meter of claim 15, further including a fluid tight housing disposed about said mass flow rate meter on said conduit, said housing including first and second semi-cylindrical halves and resilient seals disposed between said halves and about said conduit.

19. The mass flow rate meter of claim 15, wherein said curved fluid sensing arms of said first plurality of sensing elements defines a first radius, one of said two curved fluid sensing arms of said second plurality of sensing elements also defines said first radius and another of said two curved fluid sensing arms of said second plurality of sensing elements defines a second radius smaller than said first radius.

20. The mass flow rate meter of claim 15, wherein said at least one torque sensing device is one of a strain gauge, an LVDT and a servo controller operably coupled to said torque collecting ring.

\* \* \* \* \*